March 31, 1936.  L. SALZMAN  2,035,839
TRACTOR GUIDE
Filed Sept. 25, 1935  3 Sheets-Sheet 1
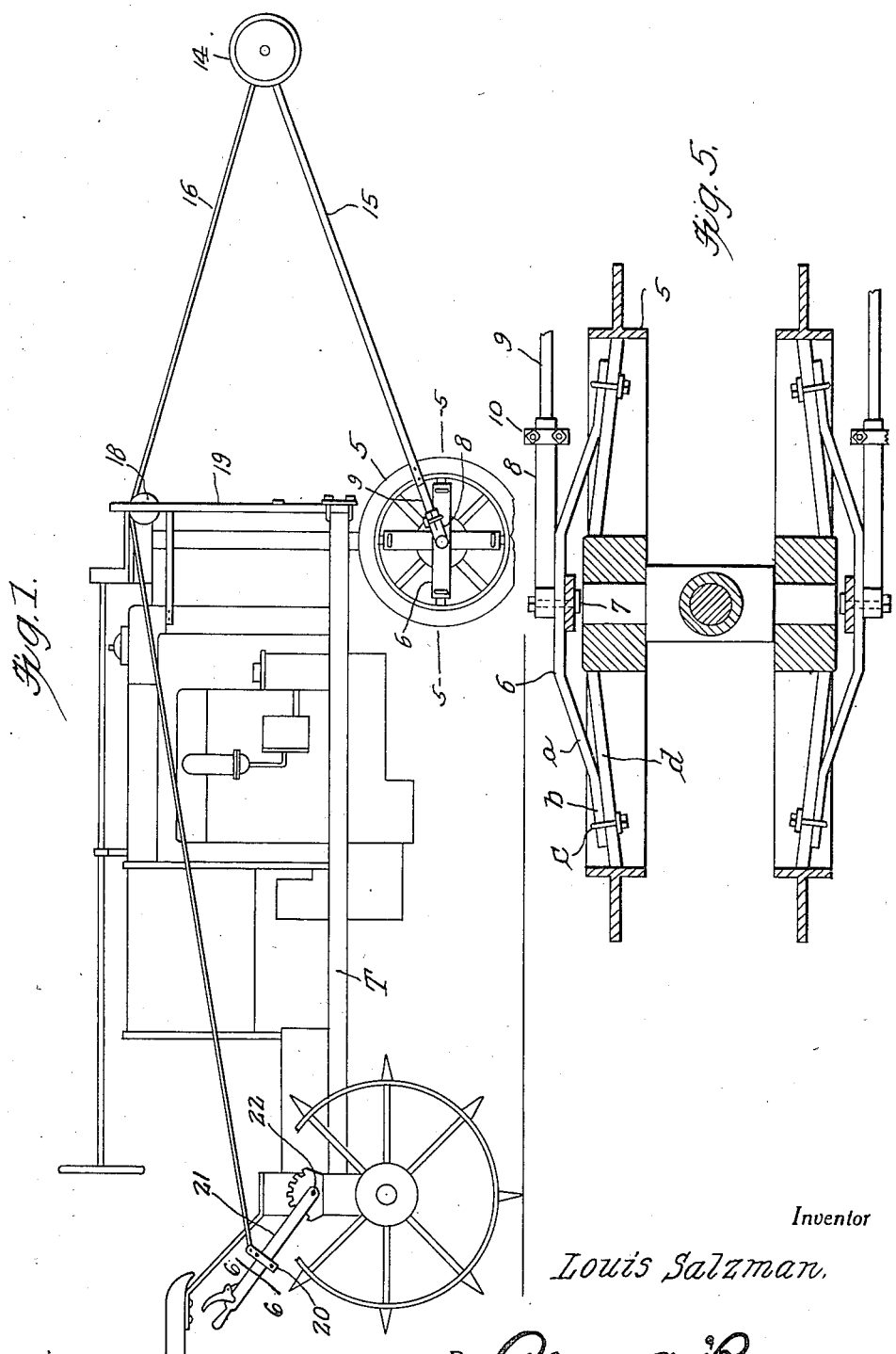
Inventor
Louis Salzman,
By Clarence A. O'Brien
Attorney

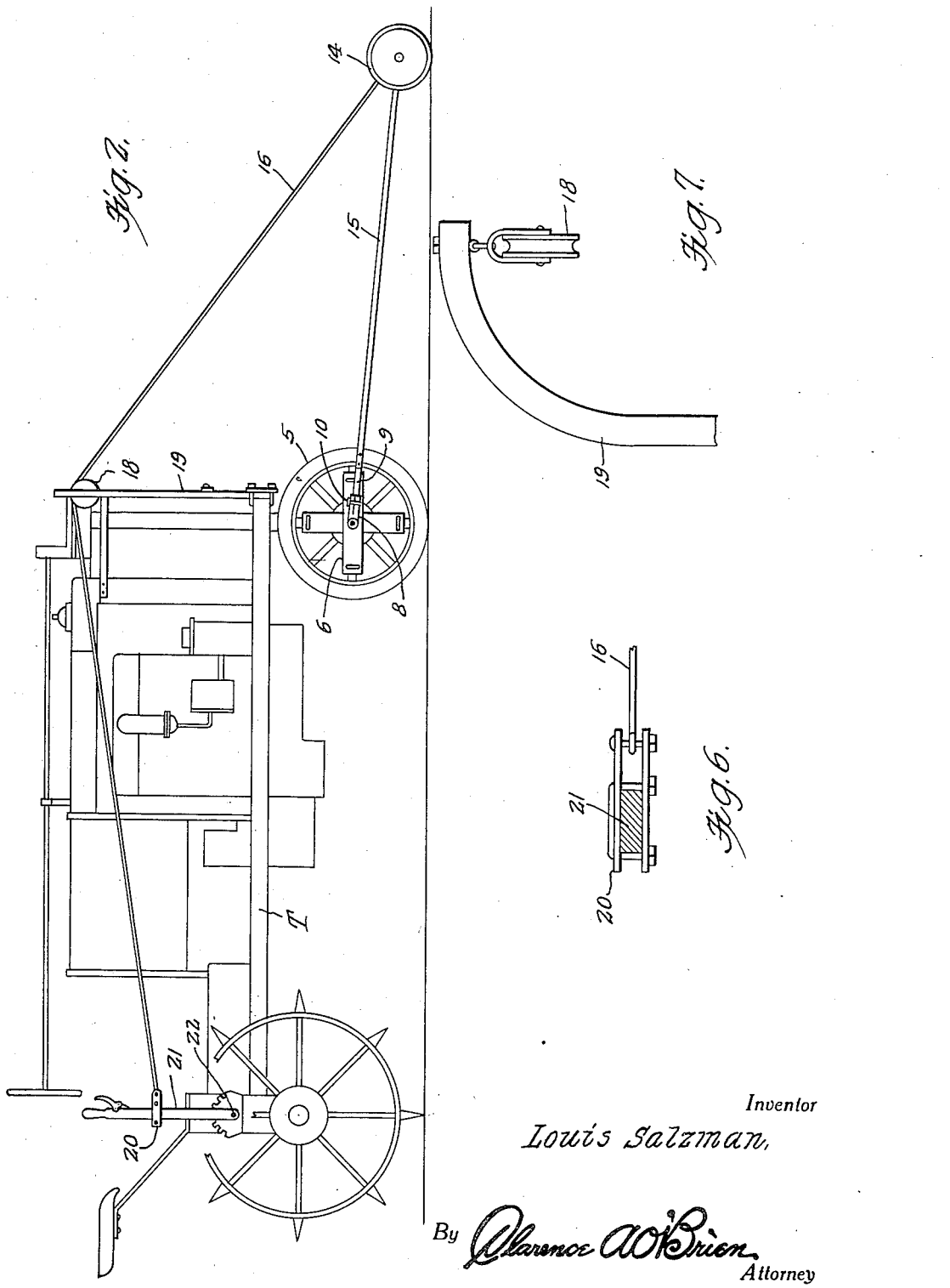

March 31, 1936.  L. SALZMAN  2,035,839
TRACTOR GUIDE
Filed Sept. 25, 1935   3 Sheets-Sheet 3
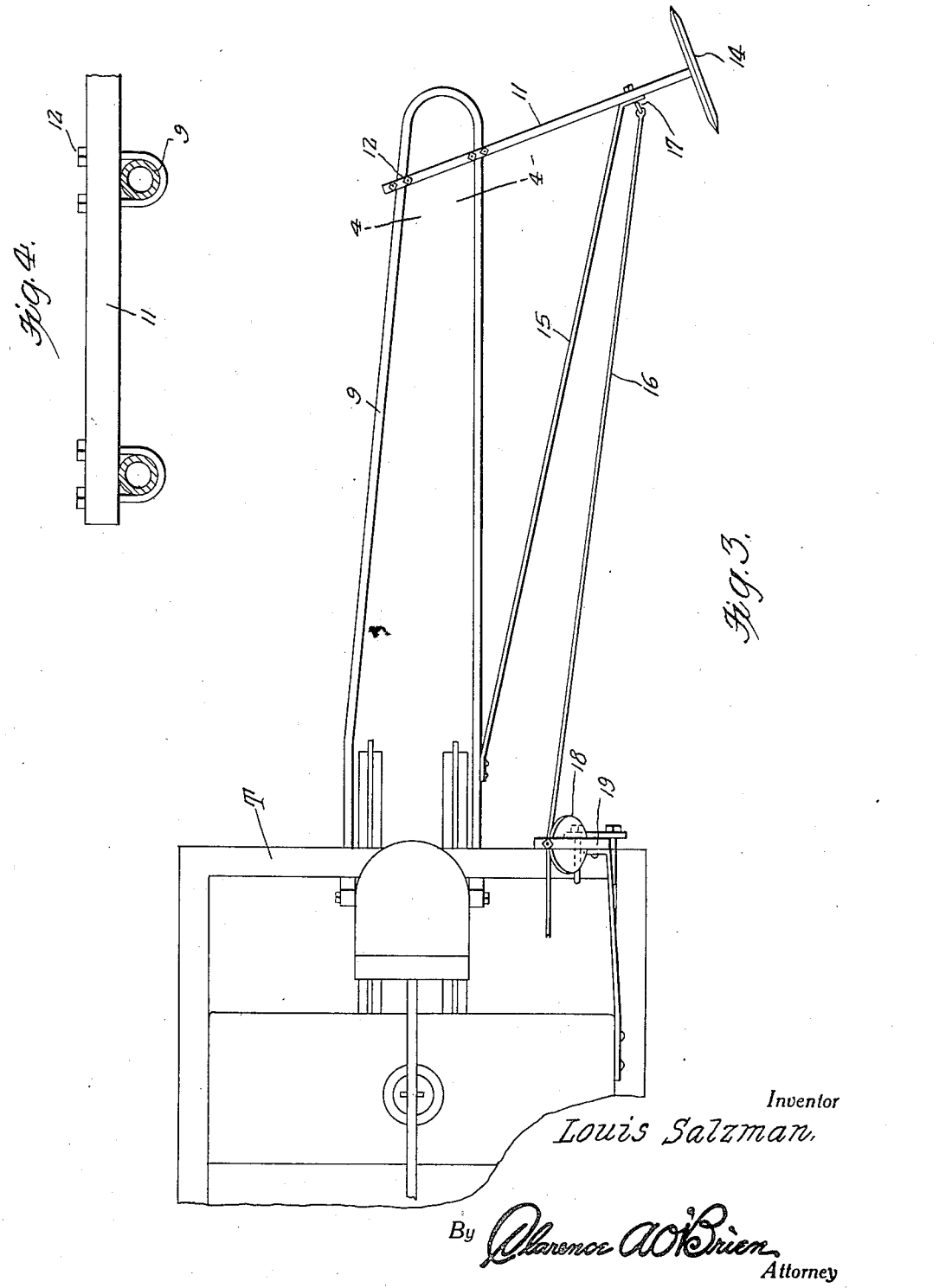
Inventor
Louis Salzman,
By Clarence A O'Brien
Attorney Patented Mar. 31, 1936

2,035,839

UNITED STATES PATENT OFFICE 2,035,839

TRACTOR GUIDE

Louis Salzman, Manhattan, Ill.

Application September 25, 1935, Serial No. 42,112

5 Claims. (Cl. 97—49)

The present invention relates to a tractor guide and has for its prime object to provide an attachment for tractors whereby the tractor, when hauling plows, cultivators and the like may be automatically kept to a path parallel with a previously formed furrow. The invention also seeks to provide a device of this nature which may be fitted to the front wheels of the tractor so that as the device follows the irregularities of the furrow, it will impart a corresponding movement of the tractor wheels whereby the tractor will be steered along the line parallel with the controlling furrow.

Another important object of the invention resides in the provision of an apparatus of this nature which is simple in its construction, inexpensive to manufacture, easy to install, thoroughly efficient and reliable in use and operation, and otherwise well adapted for the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a tractor with my attachment mounted thereon.

Figure 2 is a similar view showing the attachment in another position.

Figure 3 is a top plan view thereof.

Figure 4 is a detail sectional view taken substantially on the line 4—4 of Figure 3.

Figure 5 is a detail sectional view taken substantially on the line 5—5 of Figure 1.

Figure 6 is a detail sectional view taken substantially on the line 6—6 of Figure 1.

Figure 7 is a detail elevation of the upper end of the pulley supporting standard.

Referring to the drawings in detail it will be seen that the letter T denotes generally a well known form of tractor which includes a pair of front wheels 5. On the outer side of each front wheel there is mounted a pair of bars 6 in cruciform relationship and connected at their center by a bolt 7. Portions a of these members 6 are directed inwardly toward the wheels and their terminals b are bolted by U-bolts c to spokes d of the wheels 5. Blocks 8 are rockable on the bolts 7 and have clamp end portions for receiving the ends of an elongated U-shaped frame member 9, these ends being secured in place by U-bolt structures 10. A bar 11 is mounted diagonally on the frame 9 by suitable U-bolts 12 and extends laterally therefrom and on its end is provided with a guide wheel 14 adapted to be disposed in the guiding furrow. A brace 15 is secured to the bar 11 adjacent the wheel 14 and to one leg of the frame 9 adjacent the tractor as clearly shown in Figure 3. A cable 16 is secured to the bar 11 by the same bolt 17 that secures the brace 15 thereto and is trained over a pulley 18 mounted in a bracket 19 which rises from the forward portion of the frame of the tractor and this cable is secured by a clamp 20 to a lever 21 rockably mounted as at 22 on the rear end of the tractor adjacent the seat thereof and by swinging this lever the frame 9 with the wheel 14 may be raised up or down as desired to an inoperative or operative position.

From the above detailed description it will be readily appreciated that when the wheel is in the down position and is disposed in the adjacent guiding furrow the tractor will move along parallel to said guiding furrow so that the implement such as a plow or the like being hauled thereby will form a similar parallel furrow in the ground.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangemet of parts may be resorted to without departing from the spirit or scope of the invention as hereinafter claimed or sacrificing any of its advantages.

What is claimed is:—

1. In combination with a tractor, of tractor guide means comprising an elongated U-shaped frame, means for mounting the frame on the front wheels of the tractor, a guide wheel, and means for mounting the guide wheel on the frame, the last-mentioned means comprising a bar fixed transversely across the frame adjacent its bight.

2. In combination with a tractor, of tractor guide means comprising an elongated U-shaped frame, means for mounting the frame on the front wheels of the tractor, a guide wheel, and means for mounting the guide wheel on the frame, the last-mentioned means comprising a bar fixed transversely across the frame adjacent its bight and diagonally thereof.

3. In combination with a tractor, of tractor guide means comprising an elongated U-shaped frame, means for mounting the frame on the front wheels of the tractor a guide wheel, and means for mounting the guide wheel on the frame, the means for attaching the frame to the wheel comprising a pair of members in cruciform relationship for each wheel with the ends thereof secured to the spokes of the wheel and a bolt through the central portions thereof on which the ends of the frame are rockable.

4. In combination with a tractor, of tractor guide means comprising an elongated U-shaped frame, means for mounting the frame on the front wheels of the tractor, a guide wheel, and means for mounting the guide wheel on the frame, and means on the tractor whereby the frame may be swung upwardly or downwardly.

5. A device of the class described including an elongated U-shaped frame, a bar fixed diagonally across the frame adjacent the bight thereof, and a guide wheel journaled on the end of the bar, and a brace secured to the bar adjacent the wheel and to the frame adjacent one end thereof.

LOUIS SALZMAN.